US009060155B2

(12) United States Patent
Eronen et al.

(10) Patent No.: US 9,060,155 B2
(45) Date of Patent: Jun. 16, 2015

(54) APPARATUS, METHOD AND COMPUTER PROGRAM PRODUCT FOR GENERATING A PERSONALIZED VISUALIZATION OF BROADCASTING STATIONS

(75) Inventors: Antti Johannes Eronen, Tampere (FI); Juha Henrik Arrasvuori, Tampere (FI); Jukka Antero Holm, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1226 days.

(21) Appl. No.: 11/845,964

(22) Filed: Aug. 28, 2007

(65) Prior Publication Data

US 2009/0064227 A1 Mar. 5, 2009

(51) Int. Cl.
*G06F 13/00* (2006.01)
*G06F 3/00* (2006.01)
*H04N 5/445* (2011.01)
*G06F 17/30* (2006.01)
*H04H 60/47* (2008.01)
*H04H 60/73* (2008.01)
*H04N 21/45* (2011.01)

(Continued)

(52) U.S. Cl.
CPC ...... *H04N 5/44543* (2013.01); *G06F 17/30867* (2013.01); *H04H 60/47* (2013.01); *H04H 60/65* (2013.01); *H04H 60/73* (2013.01); *H04N 5/44513* (2013.01); *H04N 21/4532* (2013.01); *H04N 21/4312* (2013.01); *H04N 21/4622* (2013.01); *H04N 21/4823* (2013.01); *H04N 21/84* (2013.01)

(58) Field of Classification Search
CPC .................................. H04N 21/4532

USPC .................. 725/14, 16, 38, 45, 46, 59, 61
See application file for complete search history.

(56) References Cited

U.S. PATENT DOCUMENTS

2007/0157220 A1 * 7/2007 Cordray et al. ............. 725/9

FOREIGN PATENT DOCUMENTS

WO WO 2006038529 A1 * 4/2006

OTHER PUBLICATIONS

Music habits chart arcs—data visualization & visual design; Information Aesthetics, *Music Habits Charts Arcs*, Oct. 10, 2006; available at http://infoshetics.com/archives/2006/10/music_chart_arcs.html; pp. 1-3, retrieved Aug. 30, 2007.

(Continued)

*Primary Examiner* — Hunter B Lonsberry
(74) *Attorney, Agent, or Firm* — Ditthavong & Steiner, P.C.

(57) ABSTRACT

An apparatus, method and computer program product are provided for creating a personalized visualization of broadcasting stations that enables a user to quickly identify broadcasting stations that are in line with his or her tastes or preferences. Broadcasting stations may be plotted at specific locations within a personalized visualization based on the categories in which media objects broadcast by those broadcasting stations fall. This location may be continuously updated as the broadcasting stations continue to broadcast additional media objects falling within different categories. A user may similarly be plotted, and continuously updated, within the personalized visualization based on the categories in which media objects reproduced by the user fall. By viewing the personalized visualization, the user may be able to identify which of the broadcasting stations monitored are broadcasting media objects that are most in line with the media objects he or she has been reproducing.

30 Claims, 5 Drawing Sheets (51) Int. Cl.
*H04N 21/431* (2011.01)
*H04N 21/462* (2011.01)
*H04N 21/482* (2011.01)
*H04N 21/84* (2011.01)
*H04H 60/65* (2008.01)

(56) References Cited

OTHER PUBLICATIONS

Island of Music; *Abstract*; available at http://www.ofai/at/~elias.pampalk/music/abstract.html; 1 page, retrieved Aug. 30, 2007.
Zhu et al.; *Perceptual Visualization of A Music Collection*; pp. 1-4; 0-7803-9332-5/05 IEEE.
Megamu—mu times ten to the sixth; *megamu the life and work of lee byron*; available at http://megamu.com/work/listeninghistory; pp. 1-2; retrieved Aug. 30, 2007.
Musicovery: interactive webRadio; available at http://www.musicovery.com/; pp. 1-2; retrieved Aug. 30, 2007.
Real time geographical radio—data visualization & visual design; Information Aesthetics, *real time geographical radio*, Sep. 20, 2006; available at http://infosthetics.com/archives/2006/09/geographical_radio_station.html; pp. 1-3; retrieved Aug. 30, 2007.
Tzanetakis et al.; *3D Graphics Tools for Sound Collections*; pp. 4; Proceedings of the COST G-6 Conference on Digital Audio Effects (DAFX-00), Verona, Italy, Dec. 7-9, 2000.
Torrens et al.; *Visualizing And Exploring Personal Music Libraries*; pp. 1-4; 2004 Universitat Pompeu Fabra.
Van Gulik et al.; *Mapping Music in the Palm of Your Hand, Explore and Discover Your Collection*; pp. 1-6; 2004 Universitat Pompeu Fabra.
Schedl et al.; *Assigning and Visualizing Music Genres by Web-based Co-Occurrence Analysis*; pp. 1-6; 2006 University of Victoria.
Schedl et al.; *Discovering and Visualizing Prototypical Artist by Web-Based Co-Occurrence Analysis*; pp. 1-8; 2005 Queen Mary, Univeristy of London.
Gleich et al.; *The World of Music: SDP layout of high dimensional data*; pp. 1-2.

\* cited by examiner

APPARATUS, METHOD AND COMPUTER PROGRAM PRODUCT FOR GENERATING A PERSONALIZED VISUALIZATION OF BROADCASTING STATIONS

FIELD

Embodiments of the invention relate, generally, to broadcasting media objects and, in particular, to a unique way to provide a personalized visualization of various broadcasting stations in relation to a user's tastes and preferences.

BACKGROUND

It has become very popular to download and share songs, videos, televisions shows, and other types of media objects, using one's electronic device (e.g., cellular telephone, personal digital assistant (PDA), laptop, personal computer (PC), etc.). In many instances these songs, or other types of media objects, are downloaded from websites operated by music providers and/or recommendation services, such as iTunes, Pandora.com, or Last.fm, just to name a few. In these instances, individuals are able to selectively download the media objects based on any combination of different factors (e.g., the artist of the song, actors in the movie, etc.).

However, another source of electronic media objects, such as songs, television shows, movies, and the like, that has gained in popularity is broadcasting stations (e.g., radio stations, television or movie stations, etc.) that continuously stream electronic media for individuals to access and download using their electronic devices. While a convenient source of media, the user may have considerably less, if any, control over the content of these broadcasting stations. In other words, the user is not able to selectively download media objects from the broadcasting stations in the same manner in which he or she could do so using the above-referenced websites.

As a result, it may become more important for an individual to be able to learn about the types of media objects broadcast by the different broadcasting stations, so that the individual can decide whether or not he or she wishes to turn to that station. For example, an individual may desire to know what type or genre of music a radio station typically plays prior to tuning to that station.

However, in order to learn about the characteristics of different broadcasting stations, a user may be required to simply tune to respective broadcasting stations for some extended period of time in order to get a feel for the types of media objects typically broadcast by that broadcasting station. This can be very time consuming and may not be very practical.

A need, therefore, exists for a way to enable an individual to learn about broadcasting stations and be able to quickly and easily identify those that broadcast the types of media objects in which the individual is currently interested.

BRIEF SUMMARY

In general, embodiments of the present invention provide an improvement by, among other things, creating a personalized visualization of broadcasting stations that enables a user to quickly and easily identify broadcasting stations that are in line with his or her tastes or preferences at a certain period in time. In one embodiment, the electronic device (e.g., cellular telephone, personal digital assistant (PDA), laptop, personal computer (PC), or the like) operated by a user may plot broadcasting stations at specific locations within a personalized visualization or graphical representation based on the categories in which media objects broadcast by those broadcasting stations fall. This location may be continuously updated as the broadcasting stations continue to broadcast more and more media objects falling within different categories. The electronic device may similarly plot and continuously update the user within the personalized visualization based on the categories in which media objects reproduced by the user fall. By viewing the personalized visualization, the user may be able to identify which of the broadcasting stations monitored are broadcasting media objects that are most in line with the media objects he or she has been reproducing.

In accordance with one aspect, an apparatus is provided for generating a personalized visualization or graphical representation of various broadcasting stations in relation to a user's historical preferences and tastes. In one embodiment, the apparatus may include a processor that is configured to: (1) analyze one or more media objects reproduced by the apparatus to define a user preference; and (2) provide information from which a composite graphical representation of broadcast content of one or more broadcasting stations and the user preference can be constructed, wherein the information defines the location of respective broadcasting stations relative to the user preference within the graphical representation and is based at least in part on the analysis of the one or more media objects reproduced by the apparatus and of the broadcast content of respective broadcasting stations.

In one embodiment, in order to analyze the content of one or more media objects reproduced by the apparatus, the processor may further be configured to analyze metadata associated with the one or more media objects reproduced and to determine with which of a plurality of categories respective media objects reproduced are associated based at least in part on the metadata associated with the media object.

In another embodiment, the processor may further be configured to analyze the broadcast content of one or more broadcasting stations. In order to do so, the processor may similarly be further configured to analyze metadata associated with one or more media objects broadcast by respective broadcasting stations and to determine with which of the plurality of categories respective media objects broadcast are associated based at least in part on the metadata associated with the media object. Alternatively, in one embodiment, the processor may be configured to receive an indication of the number of media objects broadcast by respective broadcasting stations associated with respective categories of the plurality of categories.

In one embodiment, in order to provide information from which a composite graphical representation of broadcast content of one or more broadcasting stations and the user preference can be constructed, the processor may be further configured to first define a graphical representation of a subset of the plurality of categories with which the media objects reproduced by the apparatus are associated, wherein one or more media objects broadcast by respective broadcasting stations may likewise be associated with a respective category within the subset of the plurality of categories. The processor may further be configured to then determine, for respective broadcasting stations, a distance from respective categories of the subset based at least in part on a number of media objects broadcast by the broadcasting station that are associated with the category and, similarly, to determine, for the user preference, a distance from respective categories of the subset based at least in part on a number of media objects reproduced by the apparatus that are associated with the category.

In accordance with another aspect, a method is provided of generating the personalized visualization or graphical representation. In one embodiment, the method may include: (1) analyzing one or more media objects reproduced to define a user preference; and (2) providing information from which a composite graphical representation of broadcast content of one or more broadcasting stations and the user preference can be constructed, wherein the information defines the location of respective broadcasting stations relative to the user preference within the graphical representation and is based at least in part on the analysis of the one or more media objects reproduced and of the broadcast content of respective broadcasting stations.

According to yet another aspect, a computer program product is provided for generating the personalized visualization or graphical representation. The computer program product contains at least one computer-readable storage medium having computer-readable program code portions stored therein. The computer-readable program code portions of one embodiment may include: (1) a first executable portion for analyzing one or more media objects reproduced to define a user preference; and (2) a second executable portion for providing information from which a composite graphical representation of broadcast content of one or more broadcasting stations and the user preference can be constructed, wherein the information defines the location of respective broadcasting stations relative to the user preference within the graphical representation and is based at least in part on the analysis of the one or more media objects reproduced and of the broadcast content of respective broadcasting stations.

According to one aspect, an apparatus is provided for generating the graphical representation or personalized visualization of various broadcasting stations in relation to a user's historical preferences and tastes. In one embodiment, the apparatus may include: (1) means for analyzing one or more media objects reproduced by the apparatus to define a user preference; and (2) means for providing information from which a composite graphical representation of broadcast content of one or more broadcasting stations and the user preference can be constructed, wherein the information defines the location of respective broadcasting stations relative to the user preference within the graphical representation and is based at least in part on the analysis of the one or more media objects reproduced and of the broadcast content of respective broadcasting stations.

In accordance with yet one aspect, an apparatus is provided for generating a personalized visualization or graphical representation of various broadcasting stations in relation to a user's historical preferences and tastes. In one embodiment, the apparatus may include a processor and a display device in communication with the processor. The processor may be configured to: (1) analyze one or more media objects reproduced by the apparatus to define a user preference; and (2) provide information from which a composite graphical representation of broadcast content of one or more broadcasting stations and the user preference can be constructed, wherein the information defines the location of respective broadcasting stations relative to the user preference within the graphical representation and is based at least in part on the analysis of the one or more media objects reproduced by the apparatus and of the broadcast content of respective broadcasting stations. In turn, the display device may be configured to display the graphical representation.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, embodiments of the present invention provide an apparatus, method and computer program product for creating a personalized visualization of various broadcasting stations and of the tastes and preferences of a user, wherein symbols representing the broadcasting stations and the user are displayed within the personalized visualization or graphical representation in such a way that the user is able to quickly and easily identify broadcasting stations that are in line with or close to his or her tastes or preferences at a certain point in time. In particular, in one embodiment, the media objects (e.g., songs, television shows, movies, etc.) broadcast by the different broadcasting stations (e.g., radio, television and/or movie stations, other devices (e.g., operated by friends' and/or family) transmitting media streams, etc.) may be analyzed in order to determine in which of a plurality of categories each media object falls. The media objects reproduced by the user (e.g., played from the user's own collection, downloaded and/or received from other devices and played by the user, etc.) may similarly be analyzed and categorized.

In order to then create the personalized visualization, several categories (e.g., genres including, for example, pop, alternative, rock, rap, romance, comedy, romantic comedy, etc., depending upon the type of media object broadcast and/or reproduced) may be plotted at specific locations within the personalized visualization or graphical representation (e.g., in each of the four corners, in the middle of the top, bottom, left and right, etc.). A symbol representing each broadcasting station, as well as the user, may then be plotted on the personalized visualization based, for example, on the number of media objects broadcast or reproduced by the broadcasting station or user that fall within each of the categories plotted. For example, if a radio station broadcasts an equal number of alternative and funk songs, while broadcasting no rap or R&B songs, the symbol representing this radio station may be displayed on the personalized visualization midway between the location at which the genres alternative and funk are plotted.

Embodiments of the present invention, therefore, provide a user with a way to immediately see which of several broadcasting stations are broadcasting media objects that are similar to those that he or she has recently been reproducing. In other embodiments, discussed in more detail below, the user may be able to request that his or her electronic device identify broadcasting stations that are broadcasting a specific mix of media objects by selecting a certain position on the personalized visualization. In addition, the electronic device may be able to automatically recommend certain broadcasting stations based on a predicted trajectory of the user and the broadcasting stations over time.

Figure 1:
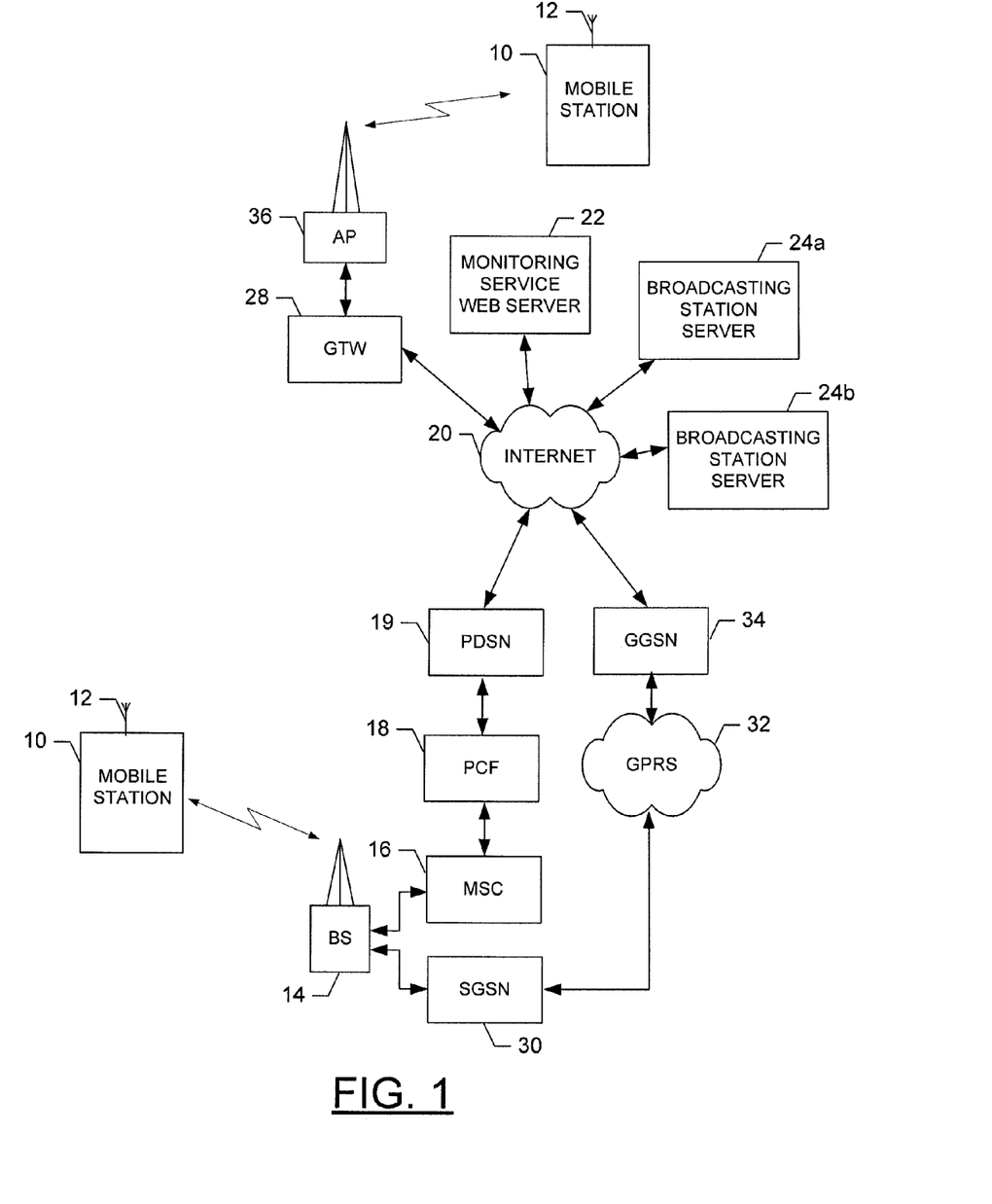
FIG. 1 is a block diagram of one type of system that would benefit from embodiments of the present invention.

Overall System and Electronic Device:

Referring to FIG. 1, an illustration of one type of system that would benefit from exemplary embodiments of the present invention is provided. As shown in FIG. 1, the system can include one or more mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the mobile station 10 via the Internet. For example, the processing elements can include a monitoring service web server 22 and/or one or more servers associated with respective broadcasting stations 24a, 24b (e.g., radio stations, television stations, movie stations, etc.), discussed below. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network (s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode mobile stations (e.g., digital/analog or TDMA/CDMA/analog phones).

One or more mobile stations 10 (as well as one or more processing elements, although not shown as such in FIG. 1) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including Wireless LAN (WLAN) techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the mobile stations and the processing elements (e.g., monitoring service web server 22 and/or one or more servers associated with respective broadcasting stations 24a, 24b) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the mobile stations 10 to one or more processing elements (e.g., a server associated with a monitoring service 22 and/or one or more broadcasting stations 24a, 24b) across the Internet 20, one or more such entities may be directly coupled to one another. As such, one or more network entities may communicate with one another in accordance with, for example, RF, BT, IrDA or any of a number of different wireline or wireless communication techniques, including LAN and/or Wireless LAN techniques. Further, the mobile station 10 and the processing elements can be coupled to one or more electronic devices, such as printers, digital projectors and/or other multimedia capturing, producing and/or storing devices (e.g., other terminals).

Figure 2:
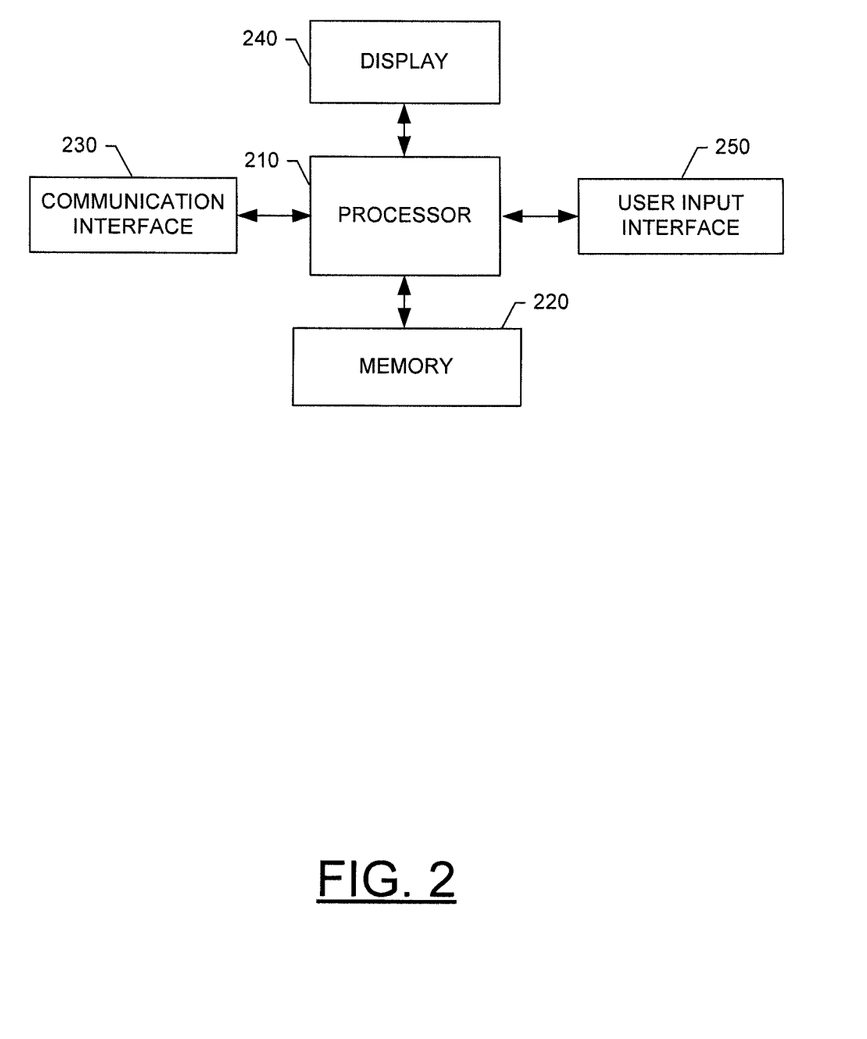
FIG. 2 is a schematic block diagram of an entity capable of operating as a monitoring service web server in accordance with embodiments of the present invention.

Referring now to FIG. 2, a block diagram of an entity capable of operating as a monitoring service web server 22 and/or a server associated with one or more broadcasting stations 24a, 24b is shown in accordance with one embodiment of the present invention. The entity capable of operating as a monitoring service web server 22 and/or a server associated with one or more broadcasting stations 24a, 24b may include various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of operating as a monitoring service web server 22 and/or a server associated with one or more broadcasting stations 24a, 24b can generally include means, such as a processor 210 for performing or controlling the various functions of the entity.

In particular, in one embodiment the processor 210 of the monitoring service web server 22 may be configured to monitor the media objects broadcast by a plurality of broadcasting stations (e.g., radio, television or movie stations) and to analyze the metadata associated with the media objects broadcast in order to generate and continuously update a profile associated with respective broadcasting stations. The profile may include, for example, a number of media objects broadcast by the broadcasting station within a certain period of time that fall within each of a plurality of categories (e.g., genres). As described in detail herein and in accordance with one embodiment of the present invention, this information may be communicated to an electronic device, so that the electronic device can create a personalized visualization of various broadcasting stations by plotting the broadcasting station (and continuously updating that plot) on a graphical representation in relation to the current tastes and preferences of the electronic device user. Similarly, in one embodiment the processor 210 of a server associated with one of the broadcasting stations 24a, 24b, may be configured to not only broadcast various media objects, but also to similarly analyze the metadata associated with the media objects broadcast and to transmit within the broadcasting stream the generated and continuously updated profile associated with the broadcast station.

In one embodiment, the processor is in communication with or includes memory 220, such as volatile and/or non-volatile memory that stores content, data or the like. For example, the memory 220 typically stores content transmitted from, and/or received by, the entity. Also for example, the memory 220 typically stores software applications, instructions or the like for the processor to perform steps associated with operation of the entity in accordance with embodiments of the present invention.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 3:
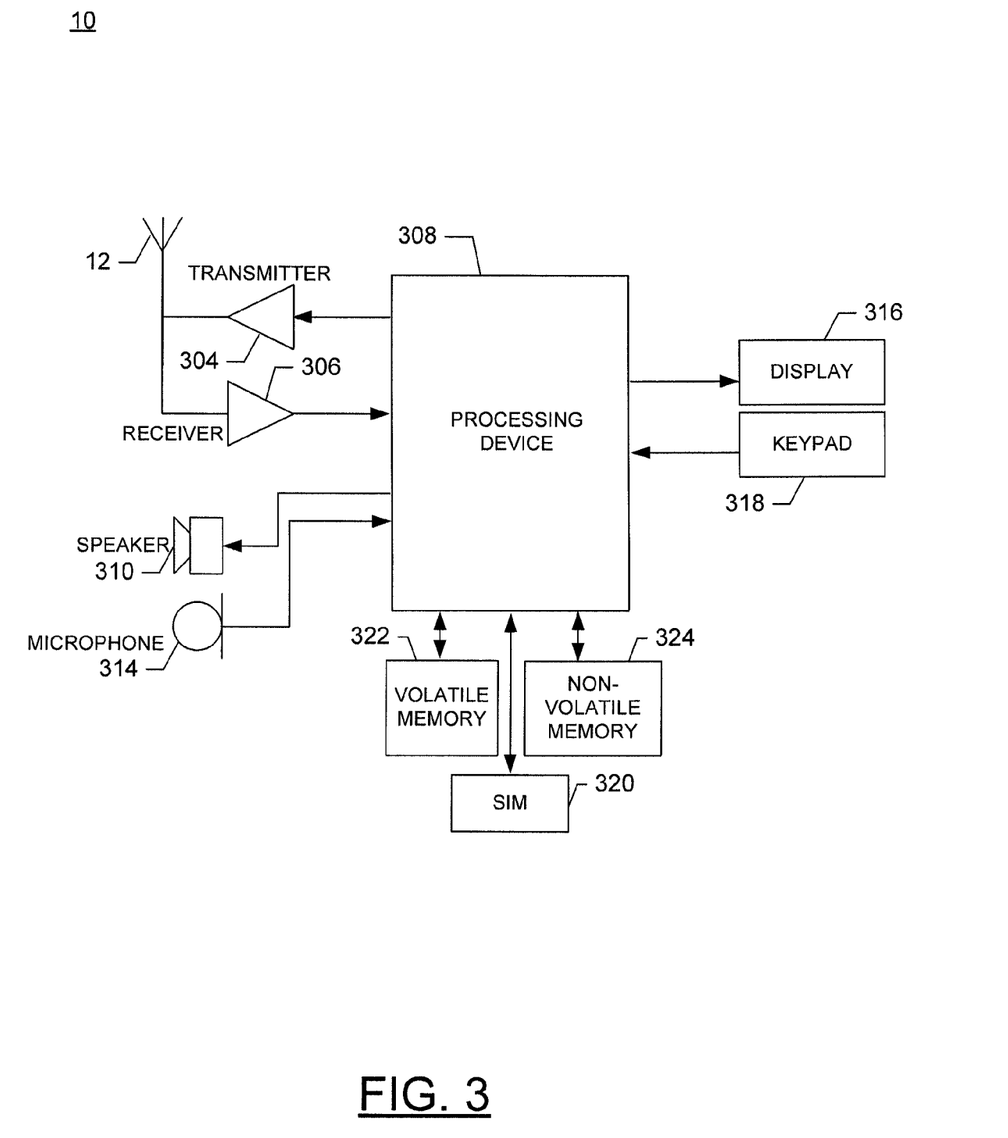
FIG. 3 is a schematic block diagram of a mobile station capable of operating in accordance with an embodiment of the present invention.

Reference is now made to FIG. 3, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein. It should be understood, however, that the mobile station may include alternative means for performing one or more like functions, without departing from the spirit and scope of the present invention. More particularly, for example, as shown in FIG. 3, in addition to an antenna 302, the mobile station 10 may include a transmitter 304, a receiver 306, and an apparatus that includes means, such as a processing device 308, e.g., a processor, controller or the like, that provides signals to and receives signals from the transmitter 304 and receiver 306, respectively, and that performs the various other functions described below including, for example, the functions relating to the analysis of media objects and broadcast content and the generation of information based upon the analysis from which a graphical representation can be produced.

As discussed in more detail below with regard to FIG. 4, in one embodiment, the processor 308 may be configured to analyze one or more media objects (e.g., songs, television shows, movies, etc.) reproduced by the mobile station 10, as well as the content of one or more broadcasting stations (e.g., radio, television and/or movie stations, as well as other devices operated, for example, by friends' and/or family transmitting media streams), and to generate a graphical representation of the one or more broadcasting stations and a user of the mobile station, wherein the location of each broadcasting station relative to the user within the graphical representation is based at least in part on the analyses performed. In particular, in one embodiment, the processor 308 may be configured to analyze the metadata associated with media objects reproduced by the mobile station and broadcast by the various broadcasting stations, in order to determine in which of a plurality of categories (e.g., genres including, for example, country, jazz, alternative, rap, romance, action, comedy, drama, etc.), each media object falls. The processor 308 may then be configured to plot a number of categories on the graphical representation, for example in each of four corners of the electronic device display screen, and to then calculate a distance from each of the categories, or corners, each broadcasting station and the user should fall based at least in part on the number of media objects reproduced or broadcast that fall within each plotted category.

As one of ordinary skill in the art would recognize, the signals provided to and received from the transmitter 304 and receiver 306, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, may include the circuitry required for implementing the video, audio, and logic functions of the mobile station and may be capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs. For example, as discussed in more detail below with regard to FIG. 4, in one embodiment of the present invention, the memory may store computer program code for analyzing one or more media objects reproduced by the mobile station, as well as the content of one or more broadcasting stations (e.g., by analyzing metadata associated with the media objects reproduced and broadcast in order to categorize those media objects) and for generating a graphical representation of the broadcasting stations and a user of the mobile station, wherein the location of the broadcasting stations relative to the user within the graphical representation is based at least in part on the analyses performed.

The apparatus, method and computer program product of exemplary embodiments of the present invention are primarily described in conjunction with mobile communications applications. It should be understood, however, that the apparatus, method and computer program product of embodiments of the present invention can be utilized in conjunction with a variety of other applications, both in the mobile communications industries and outside of the mobile communications industries. For example, the apparatus, method and computer program product of exemplary embodiments of the present invention can be utilized in conjunction with wireline and/or wireless network (e.g., Internet) applications.

Method of Generating a Personalized Visualization of Broadcasting Stations

Figure 4:
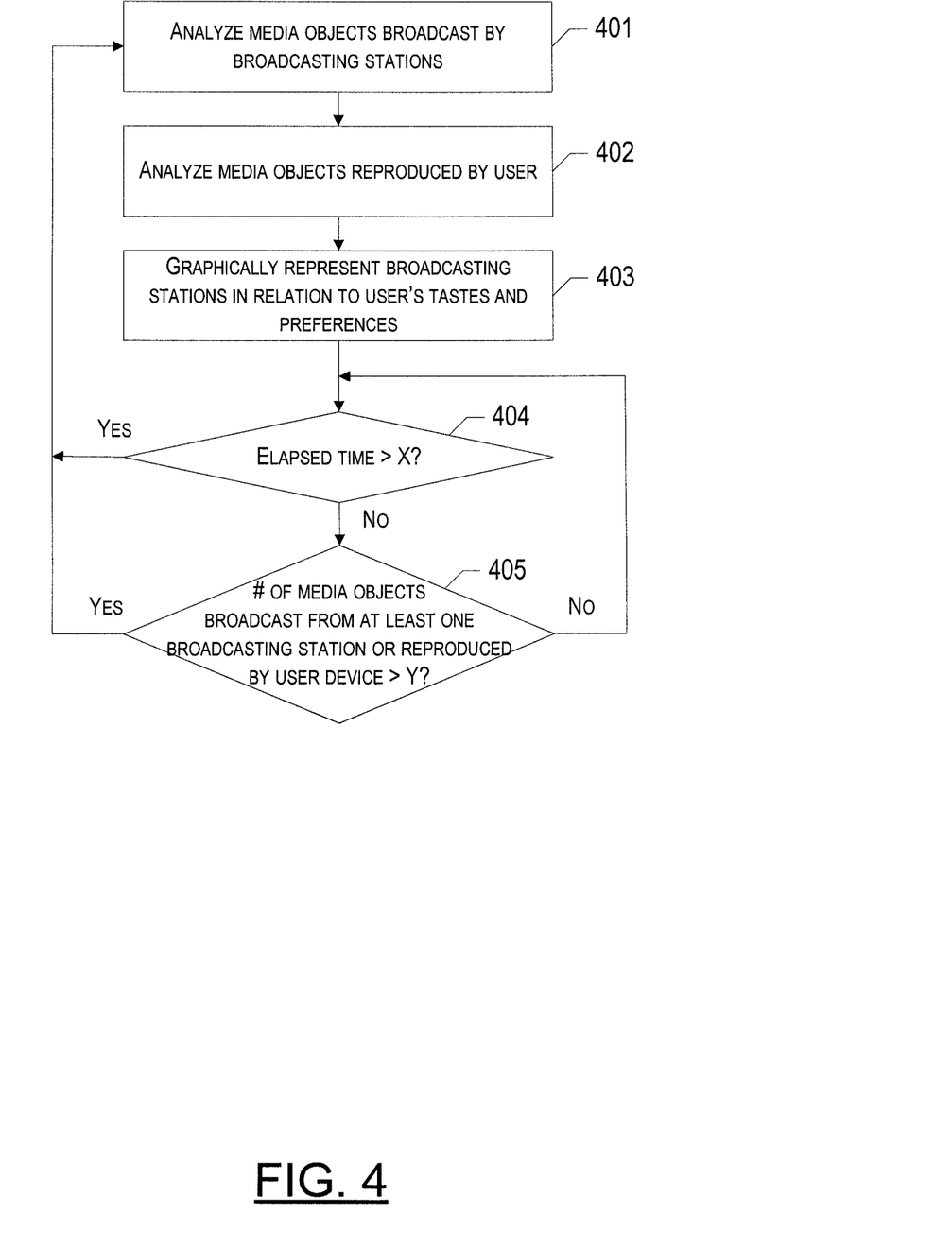
FIG. 4 is a flow chart illustrating the process of providing a personalized visualization of a user's historical preferences in relation to various broadcasting stations in accordance with embodiments of the present invention.

Referring now to FIG. 4, the operations are illustrated that may be taken in order to generate a personalized visualization or graphical representation of various broadcasting stations in relation to a user's historical tastes and preferences in accordance with embodiments of the present invention. As shown, the process may begin at Block 401, when an electronic device (e.g., a cellular telephone, personal digital assistant (PDA), laptop, personal computer (PC), etc.) and, in particular a processor operating on the electronic device, may analyze the content of one or more broadcasting stations, such as radio, television and/or movie stations, friends' or family devices transmitting media streams, or the like. According to one embodiment, in order to analyze the content of a broadcasting station, the electronic device may analyze the metadata associated with each media object broadcast by the broadcasting station (e.g., song, television show, movie, etc.) in order to categorize each media object and to create a profile of the broadcasting station based at least in part on the categories in which a majority of the media objects broadcast by that broadcasting station fall.

To illustrate, in one embodiment, the metadata associated with each media object broadcast by respective broadcasting stations may be analyzed in order to determine in which genre the media object falls. In music, genres may include, for example, alternative, classical, electronica and dance, folk, gospel, metal, hip hop, Latin, new age, reggae, soul, R&B, funk, world music, rock, jazz, pop, blues, country or rap, to name a few. In movies and television programs, genres may include, for example romance, drama, comedy, or action, to name a few. A genre count (i.e., a count of the number of media objects broadcast by the broadcasting station that fall with a particular genre category) may then be determined, and maintained, for each of several genre categories.

In one embodiment, the metadata associated with the media object may include the genre information. For example, if the media object is an audio file in MP3 (Moving Picture Experts Group Audio Layer-3) or AAC (Advanced Audio Coding) format, the song genre information may be available from the headers of the audio or music file. Alternatively, in one embodiment, only artist (or actor) and/or title information may be able to be extracted from the media object. In this embodiment, the extracted information may be transmitted to a metadata providing service in order to obtain the genre information. In yet another embodiment, where the media object comprises an audio file, acoustic analysis of the music data may be performed (e.g., by a processor operating on the electronic device) in order to determine the genre by, for example, either classifying the audio content or measuring an acoustic footprint and transmitting the footprint to a service which provides the song genre. The genre of a movie or television program may be obtained from the EPG (Electronic Program Guide) in the digital television broadcast.

In one embodiment, as described above, the foregoing process may be performed by the electronic device itself (e.g., a processor operating on the electronic device). Alternatively, in another embodiment, in order to analyze the content of various broadcasting stations, the electronic device may illicit the assistance of a monitoring service. In this exemplary embodiment, the monitoring service, and in particular an apparatus, such as a processor, operating on a web server associated with the monitoring service, may analyze the content of all available broadcasting stations, for example in the manner described above, and then transmit the results of the analysis (e.g., the genre count for each of a plurality of genre categories) for each broadcasting station to the electronic device. In yet another alternative embodiment the broadcasting station itself, and in particular a processor operating on a server associated with the broadcasting station, may analyze the metadata associated with media objects broadcast by the broadcasting station, and then transmit the analysis (e.g., the number of media objects broadcast within some predetermined period of time falling within each of a plurality of categories) within the media stream (e.g., within the radio stream of broadcast music files).

According to one embodiment, a predefined set of broadcasting stations may automatically be monitored when the process described in FIG. 4 begins. This set may be selected by the user or by the monitoring service web server, in the event that a monitoring service is used to assist in this step of the process. In either event, broadcasting stations may be subsequently added or removed from the set monitored based on the user's reproducing history (e.g., removing television stations that the user has not watched in a predefined period of time, such as a month, or adding radio stations to which the user has begun to listen). In one embodiment, the electronic device, and in particular a processor operating on the electronic device, may monitor more broadcasting stations than is shown on the screen, and then actively propose new broadcasting stations to the user by adding those broadcasting stations to the personalized visualization. For example, if the user has recently listened to heavy metal music from his or her collection of music, the electronic device may propose and visualize a new heavy metal radio station to the user and, therefore, begin analyzing the content of this newly added broadcasting station. As another example, if a certain radio station changes its music profile such that it becomes close to the user's current preferences, that radio station may be proposed to the user. In this regard, the electronic device could receive information regarding the broadcast content, the categorization of various broadcasting stations and/or the recommendation of a new broadcasting station to include in the visualization from a network entity, such as a monitoring service, or the electronic device could monitor the broadcast content of various broadcasting stations itself.

Returning to FIG. 4, the electronic device and, in particular a processor operating on the electronic device, may also, at Block 402, analyze one or more media objects reproduced by the user of the electronic device. This may include, for example, analyzing the songs a user listens to or downloads and/or the television shows or movies he or she watches or downloads using his or her electronic device. Media objects analyzed may, therefore, include those streamed from a broadcasting station, played from the user's own collection, received from friends and/or family, and/or received from a music service, such as last.fm or Pandora.com. In general, the process of analyzing media objects reproduced by the electronic device may be performed in a similar manner as the process of analyzing the content of the various broadcasting stations. In particular, the electronic device, and in particular the processor operating on the electronic device, may analyze the metadata associated with the media objects reproduced in order to determine in which of a plurality of categories, such as genres, each media object falls. A category count (e.g., genre count) may then be created for each of the plurality of categories.

Next, at Block 403, a graphical representation of the various broadcasting stations monitored in relation to the user's tastes and preferences may then be created. In one exemplary embodiment, in order to create the graphical representation, the electronic device, and in particular a processor operating on the electronic device, may first plot a subset of the plurality of categories, within which the media objects may fall, on the electronic device display screen. The subset may include any number of the available categories within the plurality of categories, including all of the available categories, if so desired. In one exemplary embodiment, the user may select the subset of categories he or she would like to plot based, for example, on categories in which media objects he or she typically reproduces will likely fall (e.g., if the user typically watches romance, drama and romantic comedy movies, he or she may select these genres to be plotted on the graphical representation). Alternatively, or in addition, the categories represented may automatically change based on the user's broadcasting history. For example, the electronic device display screen may start off showing alternative, folk, hip hop, country, rap and blues, but then remove country and rap if the user has not listened to any songs that fit within those two genre categories within some predetermined period of time (e.g., a month).

Once the subset of categories have been plotted on the device display screen, the electronic device may, in one embodiment, determine, for each broadcasting station monitored, a distance from respective categories plotted based at least in part on the number of media objects broadcast by the broadcasting station that fall within that category. Similarly, it may be determined, for the user, a distance from each plotted category based on the number of media objects reproduced by the electronic device falling within that category. The electronic device may then display a symbol representing each broadcasting station and the user on the personalized visualization at the locations determined.

Figure 5A:
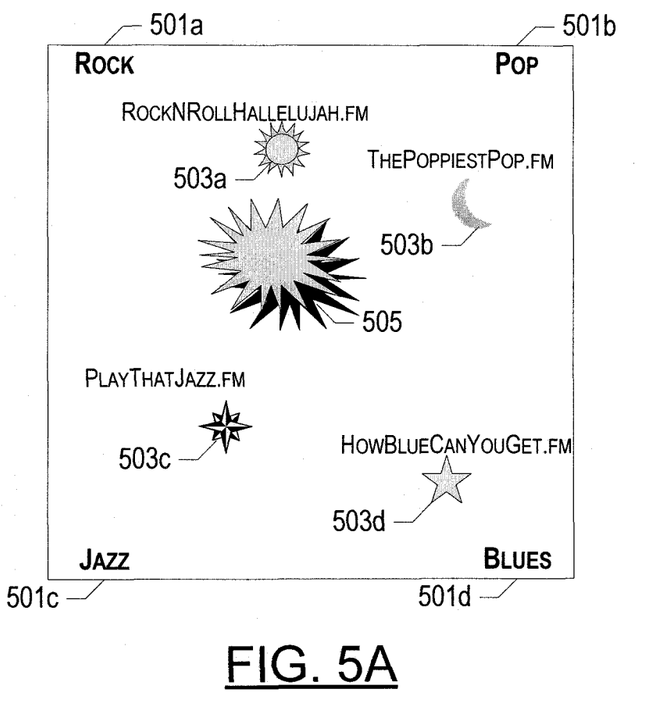
FIGS. 5A and 5B provide exemplary personalized visualizations in accordance with embodiments of the present invention.

To illustrate, reference is made to FIG. 5A which provides an example of the personalized visualization created in accordance with an embodiment of the invention. As shown, in one embodiment, each of the four corners of the electronic device display screen may be associated with a different genre (e.g., rock, pop, jazz and blues) 501a, 501b, 501c, 501d. Each broadcasting station monitored by the mobile station, as well as the user, may be represented by different symbols (e.g., a sun, a star, a moon, etc.) 503a, 503b, 503c, 503d, 505 on the electronic device display screen. The symbols may be chosen by the user from a predefined set of symbols, or they may be defined by the broadcasting station. The symbols may further be downloaded, for example, from the Internet. The more a broadcasting station broadcasts content falling within a particular genre 501a, 501b, 501c, 501d, or the more a user reproduces media objects falling within a particular genre 501a, 501b, 501c, 501d, the closer the symbol representing that broadcasting station 503a, 503b, 503c, 503d or user 505 will be to the corner of the display screen corresponding to that genre 501a, 501b, 501c, 501d. For example, the radio station HowBlueCanYouGet.fm primarily broadcasts songs that fall in the Blues genre; thus the star representing the HowBlueCanYouGet.fm radio station 503*d* is displayed very close to the bottom right corner 501*d* of the electronic device display screen, which corresponds to blues music.

Figure 5B:
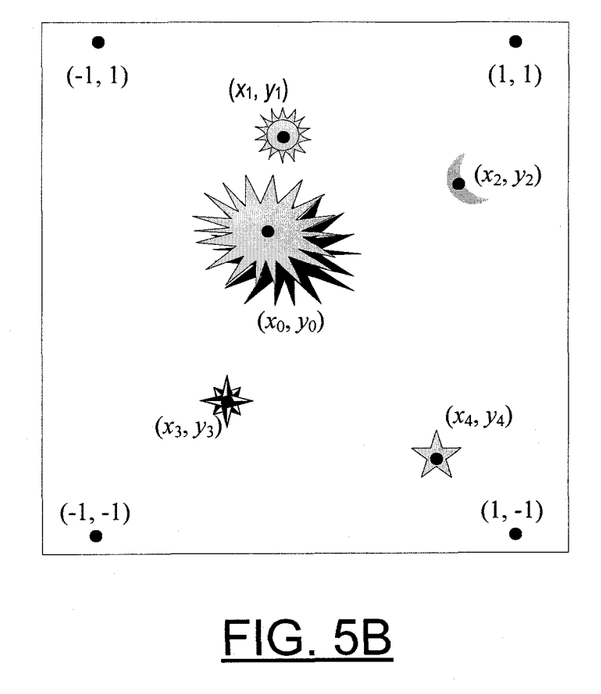

In one embodiment, illustrated in FIG. 5B, the above graphical representation may be created in the following way. The electronic device display screen may be divided into a grid, wherein four categories, such as the music genres rock, pop, jazz and blues, may be located at points (−1, 1), (1, 1), (−1, −1) and (1, −1), respectively, on the electronic device display screen grid. Each broadcasting station (e.g., RockN-RollHallelujah.fm, ThePoppiestPop.fm, PlayThatJazz.fm, and HowBlueCanYouGet.fm) may have coordinates on the grid denoted $(x_1, y_1)$, $(x_2, y_2)$, $(x_3, y_3)$ and $(x_4, y_4)$, respectively. The user may likewise have coordinates on the grid denoted $(x_0, y_0)$. In order to calculate the coordinates associated with each broadcasting station and the user, the normalized genre count for each of the four genres located at points (−1, 1), (1, 1), (−1, −1) and (1, −1) on the display screen may be determined for each of the broadcasting stations and the user. For example, $f_1=[c_1,c_2,c_3,c_4]$ may represent the normalized genre counts measured from the broadcast station RockN-RollHallelujah.fm based on the last ten music tracks broadcast by that station, where $c_1$, $c_2$, $c_3$ and $c_4$ denote the normalized genre count for the genres rock, pop, jazz and blues, respectively, and wherein $f_1(1)=c_1$, $f_1(2)=c_2$, $f_1(3)=c_3$, and $f_1(4)=c_4$. As an example, if the channel RockNRollHallelujah.fm has just played 8 rock tracks and 2 pop tracks, the normalized genre count vector would be [0.8,0.2,0,0]. Similarly, $f_2$, $f_3$, and $f_4$ may denote the genre count vectors for the channels ThePoppiestPop.fm, PlayThatJazz.fm, and HowBlueCanYouGet.fm, while $f_0$ may denote the genre counts for the media objects reproduced by the user.

The position of each broadcasting station, as well as the position of the user, on the electronic device display screen may then be calculated using the following formula:

$$(x_i, y_i) = \underline{f}_i \cdot \begin{bmatrix} -1 & 1 \\ 1 & 1 \\ -1 & -1 \\ 1 & -1 \end{bmatrix},$$

or $$(x_i, y_i) = \underline{f}_i(1)(-1, 1) + \underline{f}_i(2)(1, 1) + \underline{f}_i(3)(-1, -1) + \underline{f}_i(4)(1, -1),$$

wherein $$i = 0, \ldots 4.$$

For example, the position of RockNRollHallelujah.fm on the mobile device display screen may be calculated based on $(x_1,y_1)=c_1\cdot(-1,1)+c_2\cdot(1,1)+c_3\cdot(-1,-1)+c_4\cdot(1,-1)$, or, continuing with the example above, $(x_1,y_1)=0.8\cdot(-1,1)+0.2\cdot(1,1)=(-0.6,1)$.

As one of ordinary skill in the art will recognize, the foregoing provides only one example of the manner in which the broadcasting stations and user preferences may be mapped onto an electronic device display screen in order to illustrate which of the broadcasting stations broadcast media objects that are in line with or close to the user's preferences (e.g., by directly mapping normalized genre counts to the distance to various genre positions). The foregoing is thus provided for exemplary purposes only and should not be taken in any way as limiting the scope of embodiments of the present invention. Other schemes may likewise be used without departing from the spirit and scope of embodiments of the present invention, such as schemes that utilize more or less than four categories and schemes that are depicted in orientations that differ from the rectilinear grid described above. For example, more than four genres may be represented, and/or alternative features or characteristics other than genre, such as energy, tempo, mood, instrumentation, and the like, may be used to classify and categorize the broadcasting station and the user.

For example, in another embodiment wherein the media objects are music files or songs, the four axes of the mobile device display screen may represent Energetic, Positive, Calm and Dark. The broadcasting stations (e.g., radio stations) and user's listening history may then be analyzed for attributes that are needed to classify music into these categories (e.g., tempo, key, etc.), and the positions of the broadcasting stations and the user may be mapped to this axis.

In yet another embodiment, rather than calculating genre counts for each broadcasting station, a method, such as the one described in Tzanetakis, Cook. P., G., 3*D Graphics Tools for Sound Collections, Proceedings of the COST G-6 Conference on Digital Audio Effects* (*DAFX*-00), Verona, Italy, Dec. 7-9, 2000 (hereinafter "Cook"), the contents of which are hereby incorporated herein by reference in their entirety, may be used to analyze, in real time, a live audio signal and to classify the broadcasting station originating the signal into one of twelve categories: Male, Female, Sports, Classical, Country, Disco, Hip Hop, Fuzak, Jazz, Rock, Silence and Static. According to Cook, a confidence measure ranging from 0.0 to 1.0 may be calculated and assigned to each of the categories. According to one embodiment, this confidence measure may be used, instead of or in addition to the genre count, in order to plot the broadcasting station on the electronic device display screen (i.e., to calculate the distance of the broadcasting channel from the various categories and to update the position accordingly).

In addition to the foregoing, the visualization service provided by one embodiment of the present invention may include a zoom option, wherein the user may be able to zoom into a particular location on the personalized visualization or graphical representation of the broadcasting stations in order to see more broadcasting stations that would fall within the zoomed area. For example, a user could elect to zoom into a region that was halfway between alternative and folk in order to find a radio station that played a combination of music falling within each of these genres. In order to provide the zoom option, the electronic device, and in particular a processor operating on the electronic device, of one embodiment may be configured to receive the request from the user for broadcasting stations that would be located at a designated location on the graphical representation and to then identify one or more broadcasting stations that have broadcast a specific number of media objects falling within each of the plotted categories that would result in that broadcasting station being plotted at the designated location.

Returning to FIG. 4, in one embodiment, the foregoing processes may be repeated indefinitely in order to dynamically update the location of the broadcasting stations and the user on the personalized visualization or graphical representation displayed on the electronic device display screen. In particular, in one embodiment, the electronic device, and in particular a processor operating on the electronic device, may recalculate the position (e.g., the coordinates) of each broadcasting station, as well as of the user, after a predetermined amount of time (e.g., a day, a week, etc) has lapsed (as determined in Block 404) and/or after a predetermined number (e.g., 10) of media objects have been broadcast by at least one of the broadcasting stations or reproduced by the electronic device (as determined in Block 405).

In one embodiment, when updating the locations of the broadcasting stations and the user on the electronic device display screen, an exponentially decaying window may be used to weigh past and most recent observations (e.g., genre, or other category, counts of broadcast or reproduced media objects), such that the most recent observations (e.g., the genre count associated with the most recent media objects broadcast or reproduced) may weigh the most, while the effect of past observations may gradually diminish. These parameters, as well as the frequency of the visualization update (e.g., the amount of time that must elapse and/or the number of media objects that must be broadcast or reproduced before the location of the broadcasting stations and/or the user is updated on the graphical representation or personalized visualization) will affect how radically and how much the visualization changes as new media objects are broadcast and reproduced. In one embodiment, the user may define these parameters (e.g., the weight given to past and present observations, the delay between visualization updates, etc.). Alternatively, these parameters may be preset based on an estimate of the parameters that would be most pleasing to a majority of users.

According to another embodiment, the electronic device and, in particular a processor operating on the electronic device, may provide a "shadow trajectory," which illustrates a trajectory (e.g., a dotted line) of the positions certain broadcasting stations or the user during a predefined period of time (e.g., a week). This could be used to show the user how the content of a certain station has varied, as well as how his or her tastes and preferences have varied over time. In one embodiment, the electronic device (e.g., a processor operating on the electronic device) may use this trajectory information to make a recommendation to the user of a broadcasting station to which he or she should tune. For example, if it appears, based on the trajectory, that, assuming the broadcasting station and the user continue to move in the direction they have been, they will intersect at some point in the future (i.e., indicating the types of media objects broadcast by the station coincide with the types of media objects reproduced by the user), the electronic device, and in particular the processor operating on the electronic device, may recommend the broadcasting station to the user. Similarly, in another embodiment, the visualization may provide a history mode, wherein the user is able to see the evolution of stations or the user, him- or herself, during a predefined time period in history.

In yet another embodiment, the user may have several profiles and several visualization displays. For example, the user might desire to have separate music profiles and displays for day and night time. As another example, the user might have different music profiles for different activities, such as relaxing, partying, jogging, dining, and so on. The system could monitor the user's music consumption during each of these profiles separately and generate a different visualization for each profile. For example, the visualization created for the jogging profile may show radio stations that play music similar to music that the user has listened to while jogging. To enable the system to monitor music separately for each profile and to change the visualization, the system may allow the user to set the profile manually, or the system may try to automatically recognize the profile based, for example, on time of day, Global Positioning System (GPS) location, and/or movement information obtained from an acceleration sensor.

In general, according to embodiments of the present invention, a user's position on an electronic device display screen, as well as the position of various broadcasting stations selected by the user, may be updated according to the media objects downloaded and reproduced by the user, or broadcast by the broadcasting stations. As the user's tastes and preferences gravitate towards the types of media objects broadcast by a particular broadcasting station, the symbols representing the user and that broadcasting station will move towards one another on the electronic device display screen. In this way, a user may be able to immediately, and easily, see which broadcasting stations are closest to his or her preferences.

Based on the foregoing, embodiments of the present invention provide an individual with personalized visualizations of his or her listening and/or viewing history, making it easier for the individual to get more information on his or her preferences, despite the fact that the individual may not be able to readily classify, him- or herself, the types of media objects he or she prefers. A user may further be able to use embodiments of the present invention to compare his or her tastes and preferences to those of his or her friends or family using, for example, a split screen displaying the user's visualization next to that of his or her friend or family member.

CONCLUSION

As described above and as will be appreciated by one skilled in the art, embodiments of the present invention may be configured as an apparatus or a method. In the embodiment described above, a mobile station could embody the apparatus. However, the apparatus could be embodied by a network element, such as a proxy server or the like, which would receive and analyze information from the mobile station regarding the media objects that were selected by the user and then provide information to the mobile station or other electronic device from which a graphical representation of both the broadcasting stations and the behavior of the user could be generated. The network element of this element could also analyze the broadcast content of the broadcasting stations or the network element could receive information regarding the broadcast content, such as from a monitoring service, and then incorporate that information into the resulting graphical representation.

Regardless of its location, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   at least one processor; and
   at least one memory including computer program code for one or more programs,
   the at least one memory and the computer program code configured to, with the at least one processor, cause the apparatus embedded in a user device to perform at least the following,
   analyze one or more media objects reproduced at the device respectively related to each of a plurality of content categories to determine a location of a user preference on a composite graphical representation;
   analyze one or more media objects broadcast or streamed by one or more broadcasting stations, channels, or a combination thereof, respectively related to each of the plurality of content categories to determine one or more locations of the one or more broadcasting stations, channels, or a combination thereof, on the composite graphical representation; and
   present at a user interface of the device the composite graphical representation including the one or more broadcasting stations, channels, or a combination thereof, and the user preference at the respective determined locations relative to each of the plurality of content categories.

2. The apparatus of claim 1, wherein the apparatus is further caused to:
   analyze metadata associated with the one or more media objects reproduced to associate the user preference with one or more of the plurality of content categories and determine the location.

3. The apparatus of claim 1, wherein the apparatus is further caused to:
   analyze metadata associated with the one or more media objects broadcast or streamed by respective broadcasting stations, channels, or a combination thereof, to associate each of the broadcasting stations, channels, or a combination thereof, with one or more of the plurality of content categories and determine the one or more locations.

4. The apparatus of claim 1, wherein the apparatus is further caused to:
   receive an indication of a number of media objects broadcast or streamed by respective broadcasting stations, channels, or a combination thereof, associated with respective one or more of the content categories of the plurality of content categories.

5. The apparatus of claim 4, wherein the apparatus is further caused to:
   determine, for each of the broadcasting stations, channels, or a combination thereof, a distance from the respective content categories based at least in part on the number of media objects broadcast or streamed by each of the broadcasting stations, channels, or a combination thereof, that are associated with the respective content categories; and
   determine, for the user preference, a distance from the respective content categories based at least in part on a number of media objects reproduced by the apparatus that are associated with the respective content categories.

6. The apparatus of claim 5, wherein the distance, for respective broadcasting stations, channels, or a combination thereof, and the user preference, from the respective content categories is further based in part on a date on which respective media objects were reproduced, or broadcast, or streamed.

7. The apparatus of claim 5, wherein the apparatus is further caused to:
   receive a request for one or more broadcasting stations, channels, or a combination thereof, not included in the graphical representation, to be associated with a designated location on the graphical representation; and
   identify one or more broadcasting stations that have broadcast, streamed, or a combination thereof, a predetermined number of media objects that are associated with respective content categories of the subset that would result in respective broadcasting stations, channels, or a combination thereof, having the designated location on the graphical representation.

8. The apparatus of claim 1, wherein the plurality of content categories comprise a plurality of genres.

9. The apparatus of claim 1, wherein the apparatus is further caused to:
   repeatedly update the locations of respective broadcasting stations, channels, or a combination thereof, and the user preference within the graphical representation based at least in part on repeated analysis of the one or more media objects reproduced by the apparatus and broadcast by the respective broadcasting stations, channels, or a combination thereof.

10. An apparatus of claim 1, wherein the user device is a mobile device.

11. An apparatus of claim 1, further comprising:
    a display device configured to display the user interface with the composite graphical representation.

12. The apparatus of claim 5, wherein each of the plurality of content categories is represented at a corner in the composite graphical representation.

13. The apparatus of claim 12, wherein each of the broadcasting stations, channels, or a combination thereof, and the user preference are represented as a different graphic symbol at a respective one of the locations in the composite graphical representation.

14. The apparatus of claim 1, wherein the plurality of content categories comprise a plurality of tempos, a plurality of moods, or a plurality of instrumentations.

15. A method comprising:
analyzing one or more media objects reproduced at a user device respectively related to each of a plurality of content categories to determine a location of a user preference on a composite graphical representation;
analyzing one or more media objects broadcast or streamed by one or more broadcasting stations, channels, or a combination thereof, respectively related to each of the plurality of content categories to determine one or more locations of the one or more broadcasting stations, channels, or a combination thereof, on the composite graphical representation; and
presenting at a user interface of the device the composite graphical representation including the one or more broadcasting stations, channels, or a combination thereof, and the user preference at the respective determined locations relative to each of the plurality of content categories.

16. The method of claim 15, wherein analyzing the content of one or more media objects reproduced further comprises:
analyzing metadata associated with the one or more media objects reproduced to associate the user preference with one or more of the plurality of content categories and determine the location.

17. The method of claim 15, wherein analyzing the broadcast content of one or more broadcasting stations further comprises:
analyzing metadata associated with the one or more media objects broadcast or streamed by respective broadcasting stations to associate each of the broadcasting stations, channels, or a combination thereof, with one or more of the plurality of content categories and determine the one or more locations.

18. The method of claim 15, further comprising:
receiving an indication of a number of media objects broadcast by respective broadcasting stations, channels, or a combination thereof, associated with respective one or more of the content categories of the plurality of content categories.

19. The method of claim 18, further comprising:
determining, for each of the broadcasting stations, channels, or a combination thereof, a distance from the respective content categories based at least in part on the number of media objects broadcast by each of the broadcasting stations, channels, or a combination thereof, that are associated with the respective content categories; and
determining, for the user preference, a distance from the respective content categories based at least in part on a number of media objects reproduced by the apparatus that are associated with the respective content categories.

20. The method of claim 19, wherein the distance, for respective broadcasting stations, channels, or a combination thereof, and the user preference, from the respective content categories is further based in part on a date on which respective media objects were reproduced, or broadcast, or streamed.

21. The method of claim 19 further comprising:
receiving a request for one or more broadcasting stations, channels, or a combination thereof, not included in the graphical representation, to be associated with a designated location on the graphical representation; and
identifying one or more broadcasting stations, channels, or a combination thereof, that have broadcast, streamed, or a combination thereof, a predetermined number of media objects that are associated with respective content categories of the subset that would result in respective broadcasting stations, channels, or a combination thereof, having the designated location on the graphical representation.

22. The method of claim 15 further comprising:
repeatedly updating the locations of respective broadcasting stations, channels, or a combination thereof, and the user preference within the graphical representation based at least in part on repeated analysis of the one or more media objects reproduced by the apparatus and broadcast by the respective broadcasting stations, channels, or a combination thereof.

23. A non-transitory computer-readable storage medium carrying one or more sequences of one or more instructions which, when executed by one or more processors, cause an apparatus embedded in a user device to at least perform the following steps:
analyzing one or more media objects reproduced at the device respectively related to each of a plurality of content categories to determine a location of a user preference on a composite graphical representation;
analyzing one or more media objects broadcast or streamed by one or more broadcasting stations, channels, or a combination thereof, respectively related to each of the plurality of content categories to determine one or more locations of the one or more broadcasting stations, channels, or a combination thereof, on the composite graphical representation; and
presenting at a user interface of the device the composite graphical representation including the one or more broadcasting stations, channels, or a combination thereof, and the user preference at the respective determined locations relative to each of the plurality of content categories.

24. The non-transitory computer-readable storage medium of claim 23, wherein the apparatus is caused to further perform:
analyzing metadata associated with the one or more media objects reproduced to associate the user preference with one or more of the plurality of content categories and determine the location.

25. The non-transitory computer-readable storage medium of claim 23, wherein the apparatus is caused to further perform:
analyzing metadata associated with the one or more media objects broadcast or streamed by respective broadcasting stations, channels, or a combination thereof, to associate each of the broadcasting stations with one or more of the plurality of content categories and determine the one or more locations.

26. The non-transitory computer-readable storage medium of claim 23, wherein the apparatus is caused to further perform:
receiving an indication of a number of media objects broadcast by respective broadcasting stations, channels, or a combination thereof, associated with respective one or more of the content categories of the plurality of content categories.

27. The non-transitory computer-readable storage medium of claim 26, wherein the apparatus is caused to further perform:
   determining, for each of the broadcasting stations, channels, or a combination thereof, a distance from the respective content categories based at least in part on the number of media objects broadcast or streamed by each broadcasting station that are associated with the respective content categories; and
   determining, for the user preference, a distance from the respective content categories based at least in part on a number of media objects reproduced by the apparatus that are associated with the respective content categories.

28. The non-transitory computer-readable storage medium of claim 27, wherein the distance, for respective broadcasting stations, channels, or a combination thereof, and the user preference, from the respective content categories is further based in part on a date on which respective media objects were reproduced, or broadcast, or streamed.

29. The non-transitory computer-readable storage medium of claim 27, wherein the apparatus is caused to further perform:
   receiving a request for one or more broadcasting stations, channels, or a combination thereof, not included in the graphical representation, to be associated with a designated location on the graphical representation; and
   identifying one or more broadcasting stations, channels, or a combination thereof, that have broadcast, streamed, or a combination thereof, a predetermined number of media objects that are associated with respective content categories of the subset that would result in respective broadcasting stations, channels, or a combination thereof, having the designated location on the graphical representation.

30. The non-transitory computer-readable storage medium of claim 23, the apparatus is caused to further perform:
   repeatedly updating the locations of respective broadcasting stations, channels, or a combination thereof, and the user preference within the graphical representation based at least in part on repeated analysis of the one or more media objects reproduced by the apparatus and broadcast by the respective broadcasting stations, channels, or a combination thereof.

* * * * *